United States Patent
Lee et al.

(10) Patent No.: US 10,644,299 B2
(45) Date of Patent: May 5, 2020

(54) BATTERY MODULE, BATTERY PACK COMPRISING BATTERY MODULE, AND VEHICLE COMPRISING BATTERY PACK

(71) Applicant: LG CHEM, LTD., Seoul (KR)

(72) Inventors: Jung-Hoon Lee, Daejeon (KR);
Jeong-O Mun, Daejeon (KR);
Eun-Gyu Shin, Daejeon (KR);
Yoon-Koo Lee, Daejeon (KR);
Jong-Young Lee, Daejeon (KR);
Byoung-Cheon Jeong, Daejeon (KR);
Mi-Geum Choi, Daejeon (KR);
Torsten Karcher, Bietigheim-Bissingen (DE); Andreas Track, Bietigheim-Bissingen (DE)

(73) Assignee: LG CHEM, LTD., Seoul (KR)

( * ) Notice: Subject to any disclaimer, the term of this patent is extended or adjusted under 35 U.S.C. 154(b) by 247 days.

(21) Appl. No.: 15/739,053

(22) PCT Filed: Sep. 13, 2016

(86) PCT No.: PCT/KR2016/010349
§ 371 (c)(1),
(2) Date: Dec. 21, 2017

(87) PCT Pub. No.: WO2017/104942
PCT Pub. Date: Jun. 22, 2017

(65) Prior Publication Data
US 2018/0190965 A1    Jul. 5, 2018

(30) Foreign Application Priority Data

Dec. 18, 2015    (KR) .................. 10-2015-0182065

(51) Int. Cl.
*H01M 2/30* (2006.01)
*H01M 2/08* (2006.01)
(Continued)

(52) U.S. Cl.
CPC ............. *H01M 2/305* (2013.01); *H01M 2/06* (2013.01); *H01M 2/08* (2013.01); *H01M 2/10* (2013.01);
(Continued)

(58) Field of Classification Search
CPC .......... H01M 2/305; H01M 2/06; H01M 2/08; H01M 2220/20; H01R 13/5202; H01R 13/5216; H01R 13/784; B60L 50/66
See application file for complete search history.

(56) References Cited

U.S. PATENT DOCUMENTS 6,455,189 B1 * 9/2002 Nadeau ............... H01M 2/0237
429/121
6,733,305 B2 * 5/2004 Pan ..................... H01R 13/6271
439/247

(Continued)

FOREIGN PATENT DOCUMENTS

CN    203491307 U    3/2014
JP    11-16562 A    1/1999
(Continued)

OTHER PUBLICATIONS

EPO website machine translation of the detailed description of JP 11-016562A. (Year: 1999).*

(Continued)

*Primary Examiner* — Gregg Cantelmo
(74) *Attorney, Agent, or Firm* — Birch, Stewart, Kolasch & Birch, LLP

(57) ABSTRACT

Disclosed is a battery module, which includes a battery cell assembly having at least one battery cell, a module case configured to accommodate the battery cell assembly, and a module connector mounted at the module case, wherein the module connector includes a connector pin electrically connected to the battery cell assembly at the inside of the (Continued)

module case so as to be connected to an external connector at the outside of the module case, a connector housing mounted to an outer surface of the module case to surround the connector pin, and a sealing member provided between the connector housing and the module case.

11 Claims, 9 Drawing Sheets

(51) Int. Cl.

| | | |
|---|---|---|
| *H01R 13/52* | (2006.01) | |
| *H01R 13/74* | (2006.01) | |
| *H01M 2/10* | (2006.01) | |
| *H01M 2/06* | (2006.01) | |
| *B60L 50/60* | (2019.01) | |
| *H01R 107/00* | (2006.01) | |

(52) U.S. Cl.
CPC ..... *H01R 13/5202* (2013.01); *H01R 13/5216* (2013.01); *H01R 13/748* (2013.01); *B60L 50/66* (2019.02); *H01M 2220/20* (2013.01); *H01R 2107/00* (2013.01); *Y10S 903/907* (2013.01)

(56) References Cited

U.S. PATENT DOCUMENTS

| | | | | |
|---|---|---|---|---|
| 7,507,500 B2 * | 3/2009 | Donnelly | ............ | B60L 3/0046 429/99 |
| 8,562,374 B2 * | 10/2013 | Myer | ................... | H01R 4/2454 439/404 |
| 2006/0091849 A1 | 5/2006 | Huynh et al. | | |
| 2011/0244282 A1 * | 10/2011 | Seto | .................. | H01M 10/6553 429/82 |
| 2013/0260586 A1 | 10/2013 | Higuchi et al. | | |
| 2014/0141287 A1 | 5/2014 | Bertucci et al. | | |

FOREIGN PATENT DOCUMENTS

| | | |
|---|---|---|
| JP | 2007-102114 A | 4/2007 |
| JP | 2011-103259 A | 5/2011 |
| JP | 2012-119143 A | 6/2012 |
| JP | 2012-119144 A | 6/2012 |
| JP | 2012-133978 A | 7/2012 |
| KR | 10-2008-0077840 A | 8/2008 |
| KR | 10-2012-0059106 A | 6/2012 |
| KR | 10-1272555 B1 | 6/2013 |
| WO | WO 2013/178434 A1 | 12/2013 |
| WO | WO 2015/013158 A1 | 1/2015 |

OTHER PUBLICATIONS

International Search Report issued in PCT/KR2016/010349 (PCT/ISA/210), dated Dec. 27, 2016.

* cited by examiner

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2015-0182065 filed on Dec. 18, 2015 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

Here, the battery module includes a module case in which battery cells and various electrical parts are packaged, and a module connector connected to an external connector for electrical connection with an external device outside the module case. The external connector may be, for example, a connector for electrically connecting a plurality of battery modules.

However, in the conventional battery module, the module connector connected to the external connector is not sealed with the module case, but a wire or the like is partially exposed out of the module case, and thus a predetermined gap is created between the wire and the module case.

Accordingly, in the conventional battery module, impurities such as cooling water, fluids and dust may be introduced into the module case due to an external impact, thereby causing defects in the battery cells and various electric parts inside the module case.

Therefore, it is required to find a way to prevent the penetration of impurities into the module case near the module connector mounted at the module case.

DISCLOSURE

Technical Problem

The present disclosure is designed to solve the problems of the related art, and therefore the present disclosure is directed to providing a battery module which may prevent the penetration of impurities into a the module case near a module connector mounted at the module case, a battery pack including the battery module, and a vehicle including the battery pack.

Technical Solution

In one aspect of the present disclosure, there is provided a battery module, comprising: a battery cell assembly having at least one battery cell; a module case configured to accommodate the battery cell assembly; and a module connector mounted at the module case, wherein the module connector includes: a connector pin electrically connected to the battery cell assembly at the inside of the module case so as to be connected to an external connector at the outside of the module case; a connector housing mounted to an outer surface of the module case to surround the connector pin; and a sealing member provided between the connector housing and the module case.

The connector housing may include: a housing base mounted to an outer one surface the module case; a pin mounting portion provided at the housing base and having one surface exposed to the outside of the module case and the other surface exposed to the inside of the module case, the connector pin being mounted through the pin mounting portion to be exposed to the inside and outside of the module case; and a housing barrier protruding from one surface of the housing base to surround the one surface of the pin mounting portion, and the sealing member may be disposed between the housing base and the pin mounting portion.

The housing base may have a screw hole in which a screw member coupled to the module case by screwing is fastened.

The screw hole may be provided in a pair, and the pair of screw holes may be disposed to face each other with the housing barrier being interposed therebetween.

The one surface of the pin mounting portion may protrude higher than the one surface of the housing base.

A potting material may be adhered to the other surface of the pin mounting portion.

The housing barrier may protrude higher than the connector pin.

The housing barrier may include: a first sidewall and a second sidewall disposed to face each other with the pin mounting portion being interposed therebetween; and a third sidewall and a fourth sidewall configured to connect the first sidewall and the second sidewall and disposed to face each other with the pin mounting portion being interposed therebetween.

At least one discharge guide groove may be formed below at least one sidewall among the first to fourth sidewalls to discharge impurities including dew condensation and dust at the inside of the housing barrier to the outside of the housing barrier.

The discharge guide groove may be provided in plural, and the plurality of discharge guide grooves may be provided below the first to fourth sidewalls, respectively.

At least one anti-separation groove may be formed in at least one sidewall among the first to fourth sidewalls to elongate along an insertion direction of the external connector so that the external connector is prevented from being separated when the connector pin and the external connector are connected.

The anti-separation groove may be provided in a pair, and the pair of anti-separation grooves may be disposed to be spaced apart from each other by a predetermined distance at any one sidewall among the first to fourth sidewalls.

In another aspect of the present disclosure, there is also provided a battery module, comprising: a battery cell assembly having at least one battery cell; a module case configured to accommodate the battery cell assembly; and a module connector mounted at the module case, wherein the module connector includes: a connector pin electrically connected to the battery cell assembly at the inside of the module case; a connector housing mounted to an outer surface of the module case to surround the connector pin; and a sealing member provided between the connector housing and the module case, wherein at least one discharge guide groove is formed in the connector housing to discharge impurities including dew condensation and dust at the inside of the connector housing to the outside of the connector housing.

Moreover, the present disclosure provides a battery pack, comprising: at least one battery module according to the above embodiments; and a pack case configured to package the at least one battery module.

In addition, the present disclosure provides a vehicle, comprising at least one battery pack according to the above embodiment.

Advantageous Effects

According to various embodiments as above, it is possible to provide a battery module which may prevent the penetration of impurities into a the module case near a module connector mounted at the module case, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
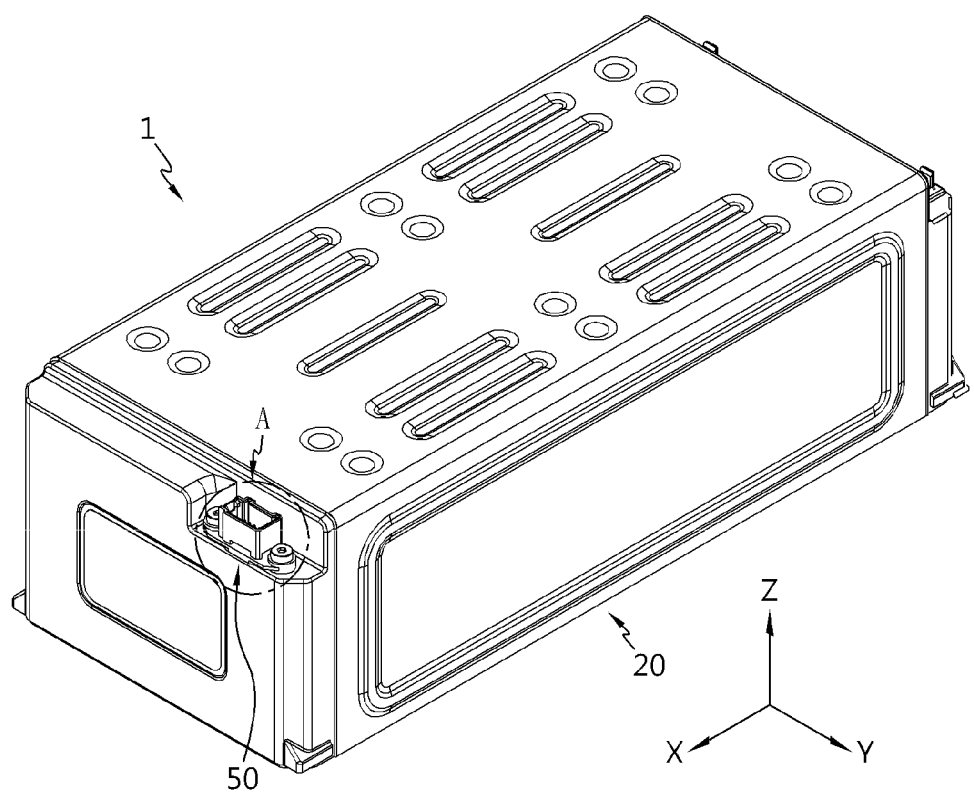
FIG. 1 is a diagram for illustrating a battery module according to an embodiment of the present disclosure.
Figure 2:
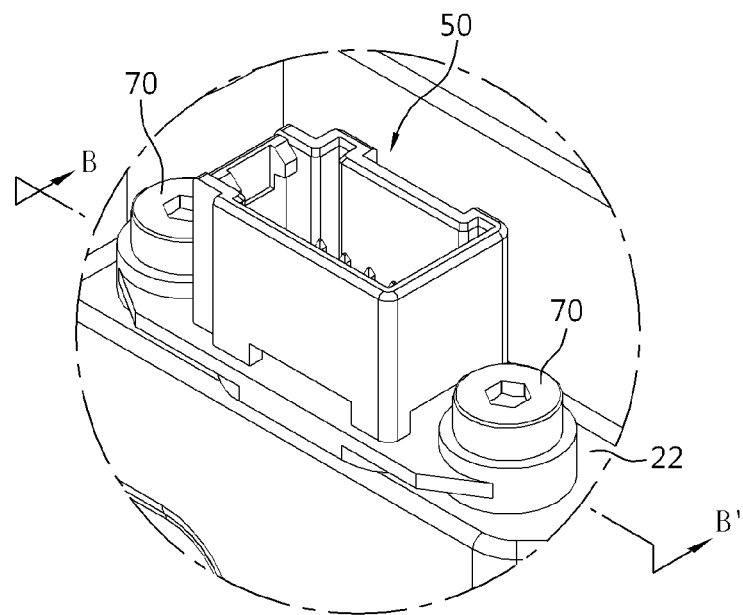
FIG. 2 is an enlarged view showing a portion A of the battery module of FIG. 1.
Figure 3:
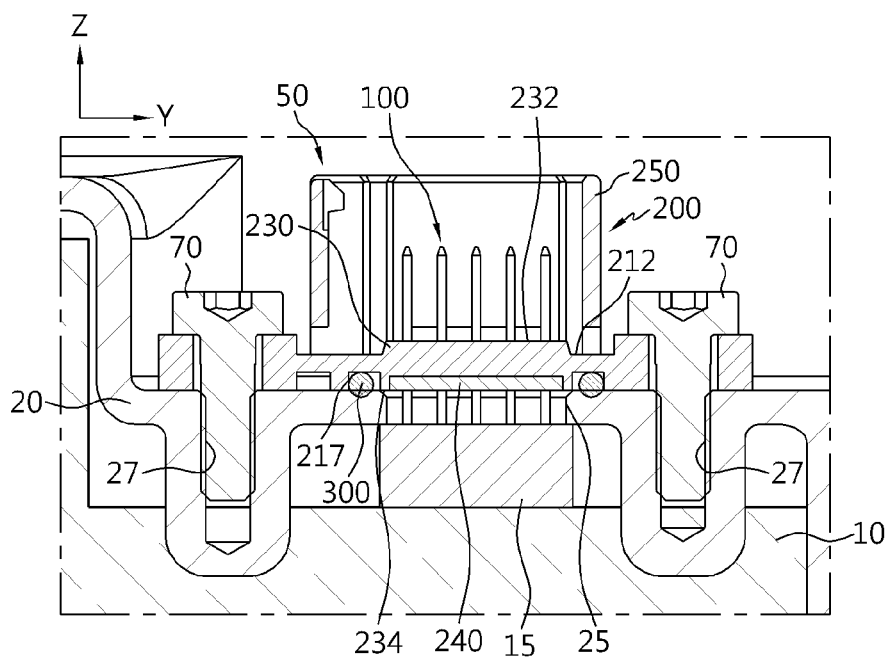
FIG. 3 is a cross-sectioned view showing the battery module of FIG. 2, taken along the line B-B'.
Figure 4:
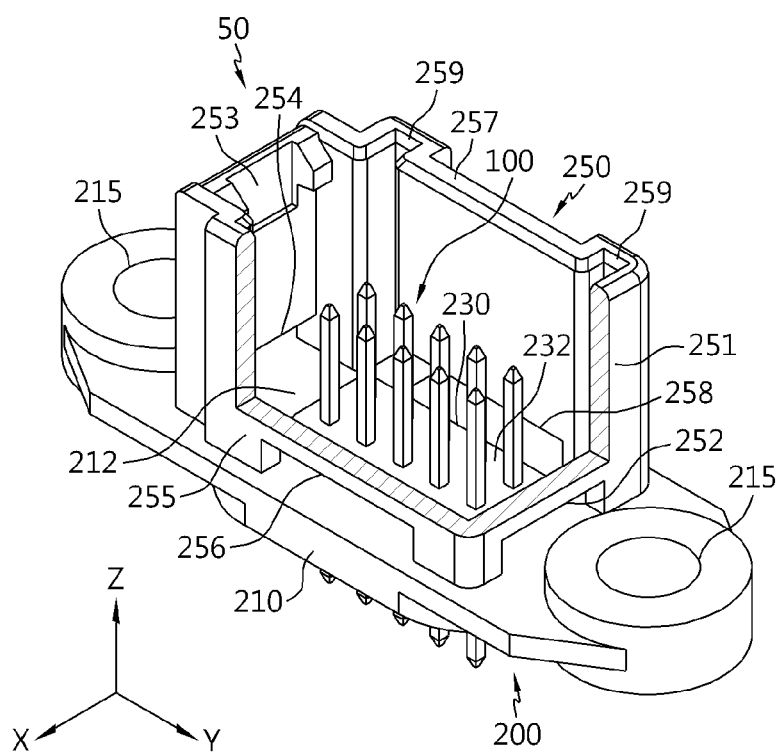
FIGS. 4 and 5 are perspective views showing a module connector of the battery module of FIG. 1.
Figure 5:
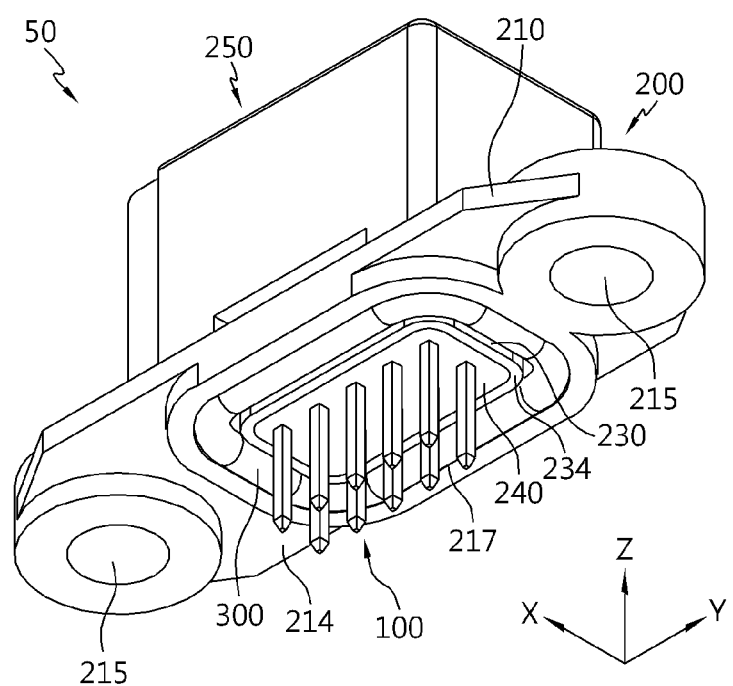
Figure 6:
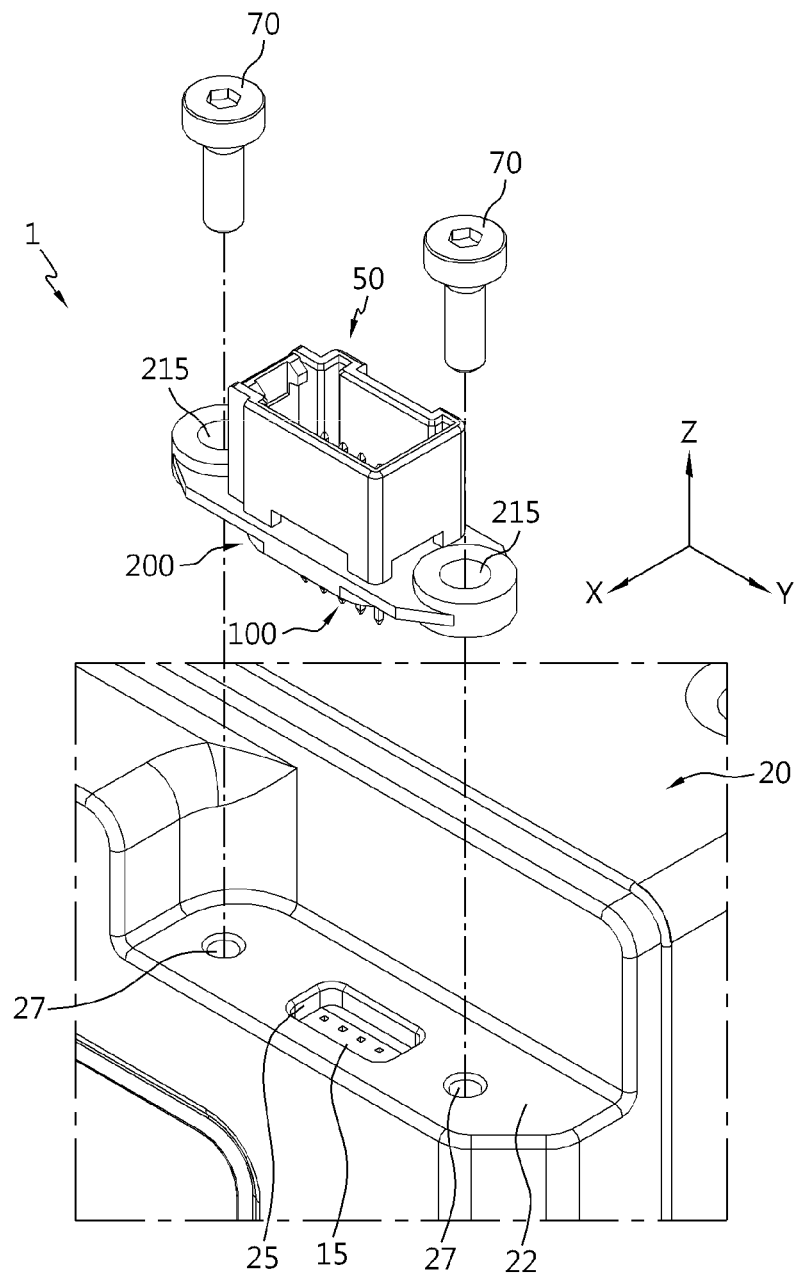
FIG. 6 is a diagram for illustrating a method of mounting the module connector of FIG. 4 to a module case.
Figure 7:
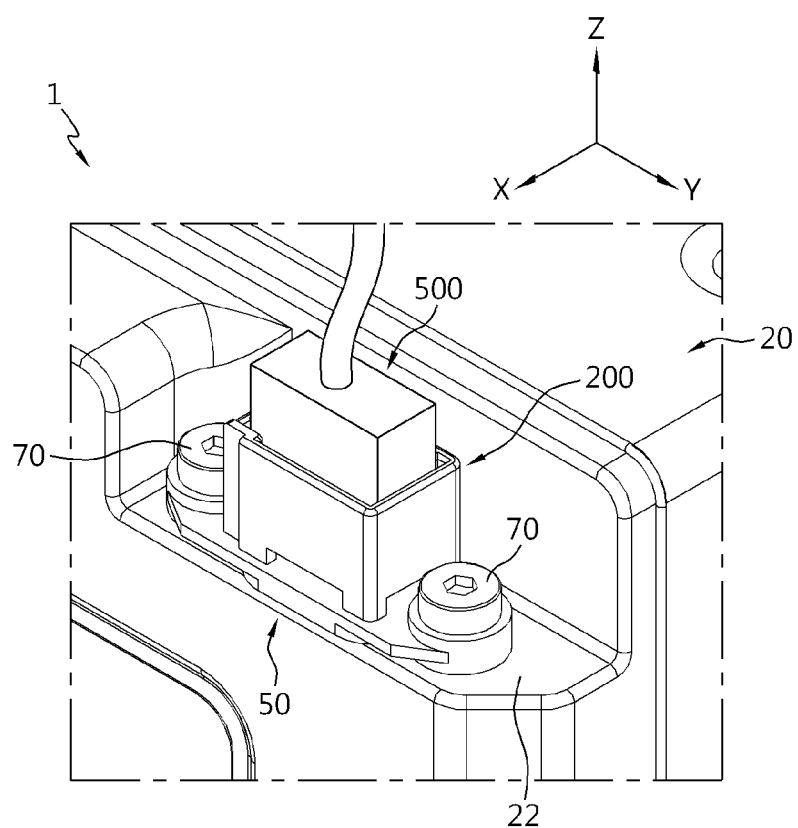
FIGS. 7 and 8 are diagrams for illustrating a method of connecting the battery module of FIG. 1 to an external connector.
Figure 8:
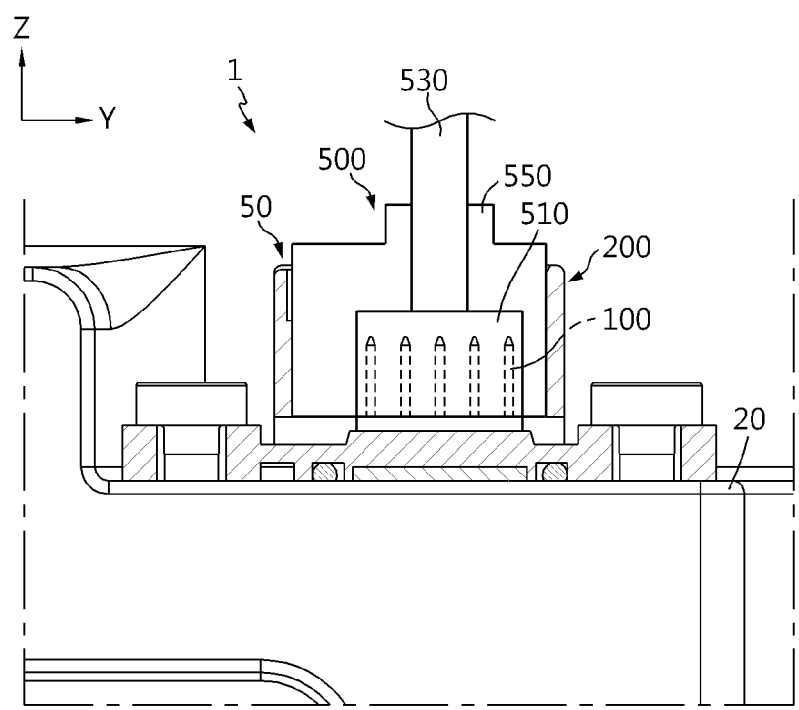
Figure 9:
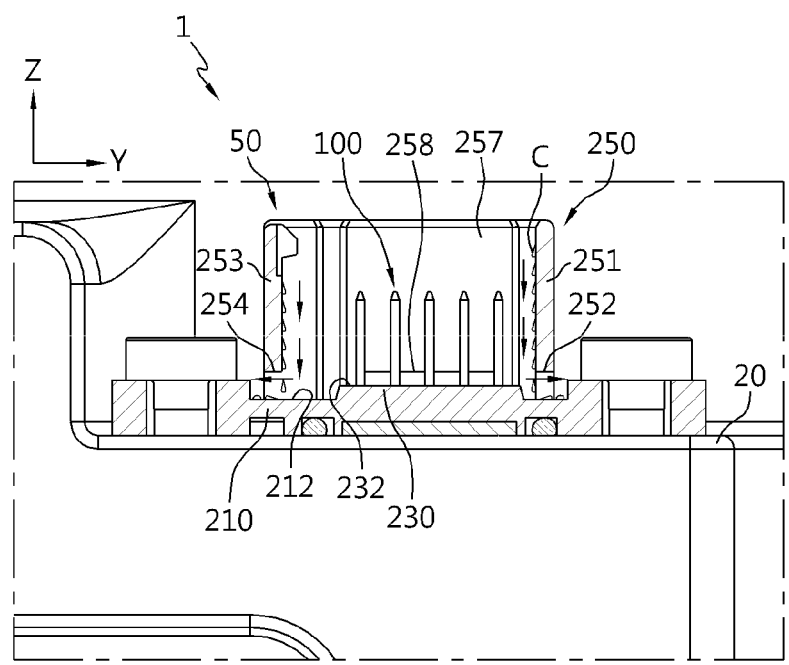
FIG. 9 is a diagram for illustrating a method of discharging impurities of the module connector of the battery module of FIG. 1.

FIG. 1 is a diagram for illustrating a battery module according to an embodiment of the present disclosure, FIG. 2 is an enlarged view showing a portion A of the battery module of FIG. 1, FIG. 3 is a cross-sectioned view showing the battery module of FIG. 2, taken along the line B-B', FIGS. 4 and 5 are perspective views showing a module connector of the battery module of FIG. 1, FIG. 6 is a diagram for illustrating a method of mounting the module connector of FIG. 4 to a module case, FIGS. 7 and 8 are diagrams for illustrating a method of connecting the battery module of FIG. 1 to an external connector, and FIG. 9 is a diagram for illustrating a method of discharging impurities of the module connector of the battery module of FIG. 1.

Referring to FIGS. 1 to 9, a battery module 1 may include a battery cell assembly 10, a module case 20 and a module connector 50.

The battery cell assembly 10 may include a battery cell, various electric parts of the battery module 1, and a cell connector 15.

The battery cell may be a pouch-type secondary battery and may be provided in plural. The plurality of battery cells may be electrically connected to each other and may respectively include an electrode assembly, a battery case accommodating the electrode assembly, and an electrode lead protruding out of the battery case and electrically connected to the electrode assembly.

The various electric parts may include an ICB board, a BMS board and the like. The electric parts such as the ICB board and the BMS board may be electrically connected to the plurality of battery cells.

The cell connector 15 is used for electrically connecting the plurality of battery cells, the ICB board and the BMS board to external devices or the like and may be connected to a module connector 50, explained later.

The module case 20 forms an appearance of the battery module 1 and may accommodate the battery cell assembly 10 therein. The module case 20 may include a pin opening 25 and a coupling hole 27.

The pin opening 25 opens an outer surface 22 of the module case 20, and may allow a connector pin 100, explained later, to penetrate into the module case 20 so that module connector 50 is connected to the cell connector 15.

The coupling hole 27 is used for coupling a pair of screw members 70 therethrough in order to mount the module case 20 of the module connector 50. The coupling hole 27 is provided at the outer surface 22 of the module case 20 and may be provided in a pair so that the pair of coupling holes are disposed to face each other with the pin opening 25 being interposed therebetween.

The module connector 50 is electrically connected to the battery cell assembly 10 and may be mounted at the module case 20 to be electrically connected to an external connector 500 or the like at the outside of the module case 20. Here, the external connector 500 may be a connector for electrically connecting a plurality of battery modules 1.

The module connector 50 may include a connector pin 100, a connector housing 200 and a sealing member 300.

The connector pin 100 is connected to the cell connector 15 of the battery cell assembly 10 at the inside of the module case 20 and connected to the external connector 500 at the outside of the module case 20, and the connector pin 100 may be provided in plural.

The connector housing 200 may be mounted to the outer surface 22 of the module case 20 to surround the connector pin 100. The connector housing 200 may include a housing base 210, a pin mounting portion 230 and a housing barrier 250.

The housing base 210 may be mounted to an outer one surface 22 of the module case 20. In detail, the housing base 210 may be mounted above the pin opening 25 and the coupling hole 27 of the module case 20 in order to prevent the pin opening 25 and the coupling hole 27 from being exposed out of the module case 20 when the module case 20 is mounted.

The housing base 210 may include a screw hole 215 and a sealing member mounting groove 217.

The screw hole 215 is used for coupling the pair of screw members 70 screwed to the module case 20 when the module case 20 is mounted to the module connector 50, and the screw hole 215 may be provided in a pair.

The pair of screw holes 215 are disposed to face each other with a housing barrier 250, explained later, being interposed therebetween, and may be disposed at both ends of the housing base 210 in a longitudinal direction (Y-axis direction), respectively. Accordingly, when the pair of screw members 70 are coupled through the pair of screw holes 215, the housing base 210 may fix and support the housing barrier 250 more stably.

The sealing member mounting groove 217 is used for mounting a sealing member 300, explained later, and may be formed at a bottom surface 214 of the housing base 210. The sealing member mounting groove 217 may be disposed to surround the pin opening 25 above the outer surface 22 of the module case 20.

The pin mounting portion 230 is used for mounting the connector pin 100 and may be provided at the housing base 210. One surface 232 of the pin mounting portion 230 may be exposed to the outside of the module case 20, and the other surface 234 of the pin mounting portion 230 may be exposed to the inside of the module case 20. Here, the connector pin 100 may be mounted through the pin mounting portion 230 so as to be exposed to the inside and outside of the module case 20.

One surface 232 of the pin mounting portion 230, in detail the top surface 232 of the pin mounting portion 230, may protrude higher than one surface 212 of the housing base 210, in detail the top surface 212 of the housing base 210. Accordingly, it is possible to prevent impurities C such as fluids and dust, which may fall in a lower direction (−Z-axis direction) along the inner wall of the housing barrier 250, explained later, from coming into contact with the connector pin 100 provided at the top surface 212 of the pin mounting portion 230.

In addition, at the other surface 234 of the pin mounting portion 230, in detail at the bottom surface 234 of the pin mounting portion 230, a potting material 240 may be adhered around the connector pin 100.

The potting material 240 is disposed in the module case 20 to seal the other surface 234 of the pin mounting portion 230, and may prevent impurities C such as dust, which may penetrate between the connector pins 100, from being introduced into the module case 20.

The potting material 240 may be made of a polyurethane resin having excellent impact resistance, abrasion resistance and rigidity. The potting material 240 may also be made of other materials capable of effectively sealing the other surface 234 of the pin mounting portion 230, without being limited to the above.

The housing barrier 250 may be formed to protrude from one surface 212 of the housing base 210, in detail from the top surface 212 of the housing base 210, to surround the connector pin 100 and one surface 232 of the pin mounting portion 230, in detail the top surface 232 of the pin mounting portion 230.

In addition, the housing barrier 250 may protrude higher than the connector pin 100 which protrudes from the top surface 232 of the pin mounting portion 230. Accordingly, the housing barrier 250 may effectively protect the connector pin 100 against external impacts or the like which may be directly applied to the connector pin 100.

The housing barrier 250 protects the connector pin 100 and also forms an accommodation space capable of accommodating the external connector 500 connected to the connector pin 100, so that the external connector 500 is stably supported when the external connector 500 is mounted.

The housing barrier 250 may include a first sidewall 251, a second sidewall 253, a third sidewall 255 and a fourth sidewall 257.

The first sidewall 251 and the second sidewall 253 are disposed to face each other along a longitudinal direction (Y-axis direction) of the housing base 210 with the pin mounting portion 230 being interposed therebetween and may be spaced apart from each other by a predetermined distance.

The first sidewall 251 may have a discharge guide groove 252.

The discharge guide groove 252 is used for discharging impurities C such as dew condensation or dust at the inside of the housing barrier 250 to the outside of the housing barrier 250, and may be formed below the first sidewall 251.

The discharge guide groove 252 may be provided in plural and may also be formed at the second to fourth sidewalls 253 to 257, in addition to the first sidewall 251. Accordingly, as shown in FIG. 9, impurities C such as dew condensation or dust at the inside of the housing barrier 250 may flow down along the inner wall of the housing barrier 250 through the plurality of discharge guide grooves 252, 254, 256, 258 and be effectively discharged out of the housing barrier 250.

The second sidewall 253 may have the discharge guide groove 254 as described above. The discharge guide groove 254 may be formed below the second sidewall 253.

The third sidewall 255 and the fourth sidewall 257 connects the first sidewall 251 and the second sidewall 253 and may be disposed to face each other along a width direction (X-axis direction) of the housing base 210 with the pin mounting portion 230 being interposed therebetween and spaced apart from each other by a predetermined distance.

In addition, the third sidewall 255 and the fourth sidewall 257 may also include the discharge guide grooves 256, 258, respectively. The discharge guide groove 256 of the third sidewall 255 and the discharge guide groove 258 of the fourth sidewall 257 may be formed below the third sidewall 255 and the fourth sidewall 257, respectively.

In addition, the fourth sidewall 257 may further include an anti-separation groove 259.

The anti-separation groove 259 is used for preventing the external connector 500 from being separated from the housing barrier 250 when the connector pin 100 and the external connector 500 are connected, and may be formed to elongate in an insertion direction (Z-axis direction) of the external connector 500, namely in a vertical direction (Z-axis direction) of the fourth sidewall 257.

The anti-separation groove 259 may be provided in a pair, and the pair of anti-separation grooves 259 may be spaced apart from each other by a predetermined distance with the discharge guide groove 258 being interposed therebetween.

When the external connector 500, explained later, is inserted into the housing barrier 250, the pair of anti-separation grooves 259 may be inserted into the external connector 500 in the insertion direction (Z-axis direction) to prevent the mounted external connector 500 from being separated. Accordingly, when the connector pin 100 and the external connector 500 are connected, they may be coupled more stably.

Meanwhile, the anti-separation groove 259 may be provided to at least one of the first to third sidewalls 251 to 255, in addition to the fourth sidewall 257. In other words, the anti-separation groove 259 may be provided in various ways to any one or more of the first to fourth sidewalls 251 to 257 as long as they are designed to prevent the external connector 500 from being separated.

The sealing member 300 is used for more effectively preventing impurities C such as cooling water, other fluids and dust at the outside of the module case 20 from penetrating into the module case 20, and may be provided between the module case 20 and the connector housing 200.

In detail, the sealing member 300 may be inserted into the sealing member mounting groove 217 of the housing base 210 so as to be disposed between the housing base 210 and the bottom surface 234 of the pin mounting portion 230.

The sealing member 300 may be an O-ring. When the module connector 50 is mounted to the module case 20, the sealing member 300 may seal the module connector 50 and the module case 20 from each other while surrounding the pin opening 25 of the module case 20.

By means of the sealing member 300, even though impurities C at the outside of the module case 20 penetrate between the module case 20 and the module connector 50, it is possible to effectively prevent the impurities C from penetrating into the pin opening 25 of the module case 20.

Meanwhile, the external connector 500 may include an external connector body 510, an external connector cable 530 and a sealing cap 550.

The external connector body 510 may be mounted to the connector pin 100 of the module connector 50 and electrically connected thereto. The external connector body 510 and the connector pin 100 may be connected at the inside of the connector housing 200 of the module connector 50.

The external connector cable 530 is connected to the external connector body 510, and may be connected to an external power source so that the battery pack 1 is electrically connected to the external power source.

The sealing cap 550 surrounds the external connector body 510, and may be interposed between the external connector body 510 and the connector housing 200 when the external connector body 510 is mounted to the connector pin 100.

The sealing cap 550 may prevent external moisture or impurities from penetrating to the external connector body 510 and the connector pin 100 and also induces the external connector body 510 and the connector pin 100 to be firmly coupled.

As described above, the battery module 1 of this embodiment may effectively prevent impurities C from penetrating into the module case 20 near the module connector 50 mounted to the module case 20.

Thus, the battery module 1 of this embodiment may prevent defects or the like of battery cells and various electric parts at the inside of the module case 20, which may be caused by introduced impurities C, by preventing the impurities C such as cooling water, other fluids and dust from penetrating into the module case 20 due to external impacts.

Figure 10:
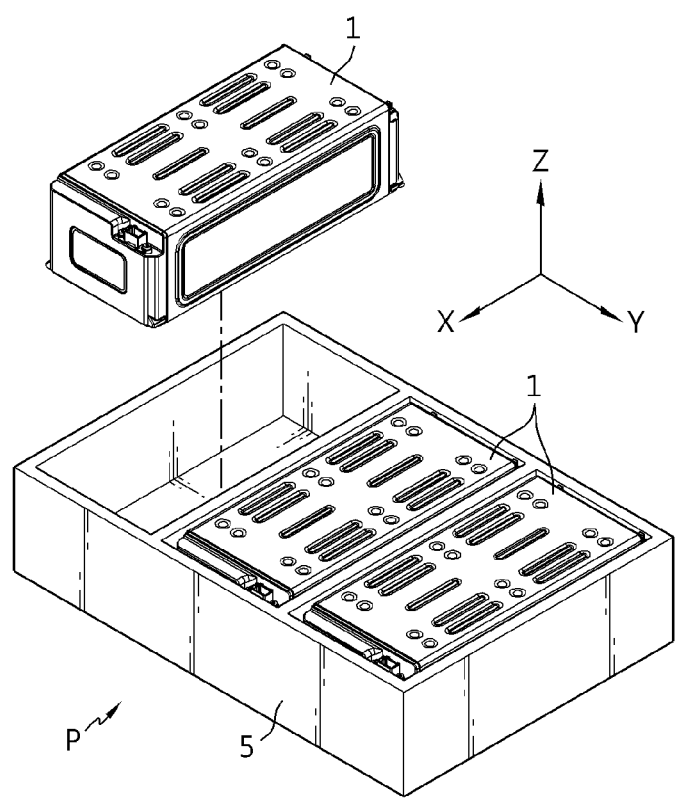
FIG. 10 is a diagram for illustrating a battery pack according to an embodiment of the present disclosure.

FIG. 10 is a diagram for illustrating a battery pack according to an embodiment of the present disclosure.

Referring to FIG. 10, a battery pack P may include at least one battery module 1 and a pack case 5 for packaging the at least one battery module 1.

At least one battery pack P may be provided to a vehicle as a fuel source of the vehicle. As an example, the battery pack P may be provided to an electric vehicle, a hybrid vehicle, and various other-type vehicles capable of using the battery pack P as a fuel source.

In addition, the battery pack P may be provided in other devices, instruments or facilities such as an energy storage system using a secondary battery, in addition to the vehicle.

As described above, the battery pack P of this embodiment and devices, instruments or facilities such as a vehicle, which have the battery pack P, include the battery module 1 as described above, and thus it is possible to implement a battery pack P having all the advantages of the battery module 1 described above, or devices, instruments, facilities or the like such as a vehicle, which have the battery pack P.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
a battery cell assembly having at least one battery cell;
a module case configured to accommodate the battery cell assembly; and
a module connector mounted at the module case,
wherein the module connector includes:
a connector pin electrically connected to the battery cell assembly at the inside of the module case so as to be connected to an external connector at the outside of the module case;
a connector housing mounted to an outer surface of the module case to surround the connector pin; and
a sealing member provided between the connector housing and the module case,
wherein the connector housing includes:
a housing base mounted to an outer one surface the module case;
a pin mounting portion provided at the housing base and having one surface exposed to the outside of the module case and the other surface exposed to the inside of the module case, the connector pin being mounted through the pin mounting portion to be exposed to the inside and outside of the module case; and
a housing barrier protruding from one surface of the housing base to surround the one surface of the pin mounting portion,
wherein the sealing member is disposed between the housing base and the pin mounting portion, wherein the housing barrier includes:
- a first sidewall and a second sidewall disposed to face each other with the pin mounting portion being interposed therebetween; and
- a third sidewall and a fourth sidewall configured to connect the first sidewall and the second sidewall and disposed to face each other with the pin mounting portion being interposed therebetween, wherein at least one discharge guide groove is formed below at least one sidewall among the first to fourth sidewalls to discharge impurities including dew condensation and dust at the inside of the housing barrier to the outside of the housing barrier.

2. The battery module according to claim 1, wherein the housing base has a screw hole in which a screw member coupled to the module case by screwing is fastened.

3. The battery module according to claim 2, wherein the screw hole is provided in a pair, and
wherein the housing barrier is disposed between the pair of screw holes.

4. The battery module according to claim 1, wherein the one surface of the pin mounting portion protrudes higher than the one surface of the housing base.

5. The battery module according to claim 1, wherein a potting material is adhered to the other surface of the pin mounting portion.

6. The battery module according to claim 1, wherein the housing barrier protrudes higher than the connector pin.

7. The battery module according to claim 1, wherein the discharge guide groove is provided in plural, and
wherein the plurality of discharge guide grooves are provided below the first to fourth sidewalls, respectively.

8. The battery module according to claim 1, wherein at least one anti-separation groove is formed in at least one sidewall among the first to fourth sidewalls to elongate along an insertion direction of the external connector so that the external connector is prevented from being separated when the connector pin and the external connector are connected.

9. The battery module according to claim 8, wherein the anti-separation groove is provided in a pair, and
wherein the pair of anti-separation grooves are disposed to be spaced apart from each other by a predetermined distance at any one sidewall among the first to fourth sidewalls.

10. A battery pack, comprising:
at least one battery module defined in claim 1; and
a pack case configured to package the at least one battery module.

11. A vehicle, comprising at least one battery pack defined in claim 10.

* * * * *